United States Patent
Randell et al.

(10) Patent No.: US 6,395,422 B1
(45) Date of Patent: *May 28, 2002

(54) ADDITIVES FOR ELECTROCHEMICAL CELLS

(75) Inventors: Christopher Fred Randell, Durham; Neal Charles White, Hexham, both of (GB)

(73) Assignee: Eveready Battery Company, Inc., St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,245

(22) PCT Filed: Jun. 3, 1996

(86) PCT No.: PCT/GB96/01319

§ 371 (c)(1), (2), (4) Date: Apr. 15, 1998

(87) PCT Pub. No.: WO96/38897

PCT Pub. Date: Dec. 5, 1996

(30) Foreign Application Priority Data

Jun. 2, 1995 (GB) .............................. 9511205

(51) Int. Cl.$^7$ ................................. H01M 6/16
(52) U.S. Cl. ....................................... 429/203
(58) Field of Search ................................. 429/203, 341, 429/342, 144

(56) References Cited

U.S. PATENT DOCUMENTS

| | | | | | |
|---|---|---|---|---|---|
| 3,944,430 | A | * | 3/1976 | Lee | 136/30 |
| 4,076,656 | A | * | 2/1978 | White et al. | 260/2.5 M |
| 4,298,666 | A | * | 11/1981 | Taskier | 429/206 |
| 4,359,510 | A | * | 11/1982 | Taskier | 429/144 |
| 4,387,144 | A | * | 6/1983 | McCallum et al. | 429/251 |
| 5,246,798 | A | * | 9/1993 | Yaacoub | 429/249 |

* cited by examiner

Primary Examiner—John Hardee
(74) Attorney, Agent, or Firm—Robert W. Welsh

(57) ABSTRACT

Polyoxyalkylene nitrogen containing compounds are useful in electrochemical cells having an acidic electrolyte to inhibit gassing and leakage.

31 Claims, No Drawings

ADDITIVES FOR ELECTROCHEMICAL CELLS

The present invention relates to additives for electrochemical cells which can eliminate or reduce undesirable effects which can arise during storage and abuse of such cells.

The history of electrochemical cells goes back to 1866 when Leclanché first discovered the principle on which they are based. The manufacture and design of electrochemical cells has come a long way since that time, but problems still remain. Cells (also known as batteries, although the term technically relates to a series of cells) essentially consist of an anode, a cathode and an electrolyte. In the present day version of the Leclancheé cell, the anode is zinc, the cathode is manganese dioxide and the electrolyte is an aqueous solution of varying proportions of zinc chloride and ammonium chloride. In other primary cells, the electrolyte is frequently an aqueous solution of potassium or sodium hydroxide. In any event, it is necessary to seal the various components into a can in order to prevent the possibly dangerous escape of the constituents, as well as to prevent the atmosphere from affecting the constituents.

The problem of leakage of the electrolyte and corrosion of the can (zinc in Leclanche cells) was very largely overcome by the addition of cadmium and mercury, but especially mercury, to the cell ingredients.

Thus, mercury was responsible for reducing perforation of the can during abuse conditions, reducing corrosion and preventing perforation during storage, and it also had the advantage that it assisted in discharge. However, now that mercury is viewed as a major environmental pollutant, there has been a very major push to develop cells with no added mercury and, to a lesser extent, cells with no added cadmium.

The essential problem with cells which have no added mercury is that no one has yet found any additive which is capable of recreating the advantages of cells which contain mercury. In fact, even the optimum selection of all of the currently known additives is not as good as mercury.

Some of the known additives which have been looked at include, for example: the arylsulphur compounds of EP-A-421660 (which prevent leakage and perforation but do not control gassing); the fluoroalkylpolyoxyethylene ether compounds of U.S. Pat. No. 4,606,984 (which control gassing but which have no effect on corrosion, leakage or perforation); the alkyl polyoxyethylene ethers of U.S. Pat. No. 3,847,669 and the alkyl polyoxyethylene phosphate ethers of GB-A-2170946 (which control gassing but nothing else); and the tetraalkyl and alkyl ammonium compounds of U.S. Pat. No. 3,945,849 (which prevent corrosion, leakage and perforation but not gassing and which also have poor electrical performance).

In addition, known additives, such as listed above, while having certain beneficial effects, have the unfortunate side-effect of reducing performance. In order to assay this, cells are kept at high temperatures for long periods (for example, 13 weeks at 45° C. and 50% r.h. [relative humidity]). Performance retention is then calculated as a measure of performance compared with similar batteries kept for two weeks at 20° C., the results ideally being in excess of 80%. In fact, the above listed additives provide performance retention generally in the region of only 75% by comparison with cells containing no additives, such cells typically having a performance retention in the region of 82%.

Apart from the necessary anode, cathode and electrolyte, practical considerations demand that a separator is provided between the anode and the cathode in order to avoid possible contact between the anode and cathode, which could lead to undesirable short circuiting.

In general, one of two types of separator is employed, and is either a gel/paste composition or coated paper. With the drive to greater efficiency and performance, the coated paper separators are particularly preferred, as they take up less space in the cell.

The coated paper separators are coated with starch which, in the presence of the electrolyte, is tonically conductive, but not electronically conductive.

We have now, surprisingly, established that polyoxyalkylene nitrogen containing compounds can be used as additives in electrochemical cells in order to alleviate or even overcome many of the problems associated with cells having no added mercury.

Thus, in a first aspect, the present invention provides an additive for use in an electrochemical call having an acidic electrolyte, characterised in that the additive is a polyoxyalkylene nitrogen containing compound.

Additives of the present invention are useful to help inhibit gassing and leakage in electrochemical cells, especially cells with no added mercury, as well an having minimal adverse effect on the performance of the cell.

In fact, we have found that polyoxyalkylene nitrogen containing compounds generally perform as well as, or better than, any single other additive intended to prevent gassing, leakage or corrosion. In addition, we have also found that performance is often enhanced. Thus, the compounds of the invention are generally useful to reduce corrosion, gassing and leakage, a combination which has not previously been observed for any single additive.

Furthermore, as stated above, arylalkylpolyoxyethylene ether and trimethylalkyl ammonium both have good anti-gassing properties, but a combination of these two compounds does not have the same effect as the compounds of the present invention. Whilst the combination of compounds is slightly better than arylalkylpolyoxyethylene ether alone, the compounds of the present invention are generally capable of reducing gassing by up to half, or more, of the levels observed with the arylalkylpolyoxyethylene ether additives.

The nitrogen containing compounds of the present invention may be of any type that is suitable to be substituted by one or more polyoxyalkylene groups. Whilst amine and ammonium compounds are preferred, especially the amine compounds, other compounds which have substitutable nitrogen bonds are also suitable, such as carbamoyl, diazo and aci-nitro compounds.

The individual alkylene moieties in the polyoxyalkylene substituents may be the same or different, but will generally be the same owing to the methods of manufacture employed for such compounds. Useful alkylene groups tend to be restricted to the ethylene and propylene groups, but the propylene groups are not as good as the ethylene groups at preventing gassing, so that polyoxyethylene nitrogen containing compounds are preferred, especially the polyoxyethylene amines. It will be appreciated that it is possible for any given polyoxyalkylene moiety to contain a mix of lower alkylene groups, such as methyl, ethyl and propyl. Where this is the case, then we prefer the average alkylene length to be two, or close to two, carbon atoms.

The compounds of the invention are commonly available as surfactants, typically as provided in "Industrial Surfactants Electronic Handbook" (published by Gower and edited by Michael and Irene Ash).

Regarding the nitrogen atom, it is particularly preferred that this is substituted by at least one polyoxyalkylene group and one alkyl group. The alkyl group may be substituted by one or more substituents, such as hydroxy groups and halogen atoms, but it is generally preferred that the alkyl group is unsubstituted. It is also preferred that the alkyl group should be straight chain and contain from 1 to 30 carbon atoms.

Compounds of the present invention may also contain more than one amine centre, in which case it is preferred that the individual amine groups are bridged by alkylene groups, preferably a short chain alkylene group such as a trimethylene group.

The chain length of the polyoxyalkylene group is not particularly important to the present invention, but we prefer that the chain length should be between 1 and 50, preferably with an average length of between 3 and 15 and especially around 10, an average length of 10 being the most preferred. Furthermore, compounds derived from coconut amines are preferred, and coconut alkyl groups contain between 6 and 18 (inclusive) carbon atoms. Thus, the most preferred compounds of the present invention are mono- and di-amines wherein the free alkyl group has between 6 and 18 carbon atoms, the side chains are polyoxyethylene substituents having an average of 10 oxyethylene units each and, where the compound is a diamine, then the link between the two amine centres is trimethylene. It should be noted that, while an average length of 10 is preferred, this is the overall average for the side chains of molecules in a given sample, so that the range of chain lengths may be from 6 to 18, but with an average chain length of 10. For example, Crodamet C20, a preferred compound, is a monoamine having two polyoxyethylene side chains, the number of oxyethylene units being 20 moles per mole of Crodamet C20.

Suitable formulae for preferred compounds of the present invention are as shown below.

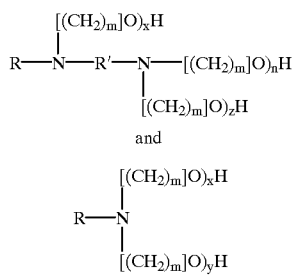

wherein R represents an optionally substituted alkyl group having from 1 to 30 carbon atoms, R' represents an alkyl group having from 2 to 10 carbon atoms, each m is the same or different and represents an integer from 1 to 4 inclusive, and n, x, y, and z are the same or different, and each represents an integer between 1 and 30. More preferred are compounds having the following formulae. It should be noted that, where compounds of the present invention are depicted by formulae, then the invention relates to either or both of the formulae.

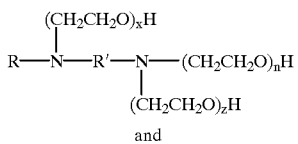

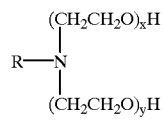

Particularly preferred compounds are those wherein R has an average of around 10 carbon atoms, R' has 3 or 4 carbon atoms, each m is 2 and n, x, y and z each averages about 10. The optional substituents are as noted above, but there are preferably no substituents.

The additives of the present invention may be added at any stage during the preparation of the electrochemical cell. There is no particularly preferred method of addition to the cells of the invention, provided that the additives are able to dissolve in the electrolyte.

One method of adding the additives to the cell is to coat a dilute aqueous solution of the additives on the inside of the can. The solvent is then allowed to dry out leaving a coated can. In fact, this method is suitable for testing new additives, but is not generally industrially practicable, although it is advantageous to provide the additive, initially at least, where it can act at the surface of the can.

The cells with which the additives of the present invention are typically used have a cathode made of manganese dioxide and acetylene black, the manganese dioxide being in finely divided form and mixed with acetylene black before mixing with the electrolyte, as is well known in the art. The additives of the invention may be mixed with the dry components of the cathode, or may be introduced together with the electrolyte. The mix is formed into the cathode and introduced into the cell where the pressure exerted on the cathode during insertion causes the electrolyte to escape slightly from the cathode so as to permeate the separator. This method of addition of the additive poses no problems, but requires sufficient additive to be able to be dispersed throughout the mix, typically in a proportion of about 0.01 to 2% w/w (additive/mix), preferably about 0.04 to 1%, and most preferably 0.1%.

We prefer to introduce the additive into the separator coating. To do this, it is generally necessary to add the additive and the gellant to the water before adding starch in order to provide the least complications with regard to uneven distribution. The coating can then be applied to the paper in a known fashion, and the resulting separator is then ready for use in an electrochemical cell. A suitable amount of the additive of the present invention to incorporate into an electrochemical cell will be readily apparent to a man skilled in the art. However, a suitable amount to add to the separator, for example, is, with respect to the dry coating weight of the coating, from 0.1 to 10%, more preferably from 0.5 to 5% and especially about 1.5%. It will be appreciated that this method of use of the additives of the invention is preferable to incorporation into the cathode mix, as it uses less additive.

Crosslinked starch molecules are a necessary part of the coating, as is a gum (or gelling agent). Advantageously, the additives of the present invention are used in conjunction with a coated paper separator, wherein the coating comprises a highly crosslinked starch and has an etherified cellulose derivative as a gelling agent.

The term "highly crosslinked" is well known in the starch industry and, with respect to batteries, the preferred starches are corn, wheat and potato starches. Suitable examples of highly crosslinked corn starch include: Vulca 90 and Vulca 84 (Trademarks of National), Celex (Trademark of Nippon Starch Refining Company Limited) and the starches produced by Roquette, such as Lab 2211. Suitable examples of highly crosslinked potato starch include Vector R140 and Vector R120 (Trademarks of Roquette). A suitable example of a wheat starch is Lab 2214 (Roquette).

We prefer that the starch used in the coating is only a highly crosslinked starch, such as described above. If not, then it is desirable to keep the proportion of highly crosslinked starch as high as possible, preferably substantially over 50% of the dry weight of the coating mix, more preferably over 80% and ideally over 90%.

We also prefer to use etherified cellulose derivatives as the gellant, and suitable examples include: Tylose MH200K (Trademark of Hoechst), Tylose MH50, Culminal MHPC100 (Trademark of Aqualon) and Courtaulds DP 1209.

Etherified cellulose derivatives may be any that are suitable, by which is meant that the compound should swell and gel substantially immediately and remain stable in the presence of water.

Suitable examples of etherified celluloses include methyl cellulose, ethyl cellulose, hydroxymethyl cellulose, carboxymethyl cellulose (including salts, such as the sodium salt), hydroxyethyl cellulose, ethylhydroxyethyl cellulose, methylhydroxyethyl cellulose, 2-hydroxypropyl cellulose, methylhydroxypropyl cellulose and 2-hydroxypropylmethyl cellulose.

Particularly preferred combinations of etherified cellulose derivatives comprise or consist of Vulca 90 with Tylose MH200K, Tylose MH50 or Courtaulds DP 1209.

The nature of the paper to be used is not critical to the present invention, and may be any that is known in the art for use as a separator. Suitable simplex papers include Enso 80 (Trademark of Enso), Amatfors 57 and Sibille Dalle 64, while suitable duplex papers include PBDE 100 and PBDE 70 (NKK).

The compounds of the present invention (also referred to as "additives" herein) have been found to be most useful in electrochemical cells having acidic electrolytes. Use of certain additives of the invention, especially those with longer alkyl chains, such as those based on tallow, in cells having alkaline electrolytes can lead to increased gassing, thereby rendering them unsuitable for use in such cells.

Typical cells in which the compounds of the present invention can be used include primary and secondary zinc carbon cells, including those cells known as Leclancheé and zinc chloride cells. The electrolyte in such cells is typically as follows: Leclancheé electrolyte—5–20% zinc chloride, 30–40% ammonium chloride, remainder water; zinc chloride electrolyte—15–35% zinc chloride, 0–10% ammonium chloride, the remainder water. Some other suitable cells for use in the present invention are described in Chapter 5 of the Handbook of Batteries and Fuel Cells (edited by David Linden, published by McGraw Hill).

The cells in which the additives of the present invention can be used may also be of any suitable configuration, such as round, square or flat and, in any of these configurations, it will be readily apparent to the man skilled in the art as to how to introduce the additives of the invention. Thus, in addition to the aspects described above, the present invention also provides a cell comprising a separator and/or a compound as described above, especially where the cell contains an acidic electrolyte when it comprises a compound of the invention.

In order to better assay cells using the additives of the invention, we have developed a further two new tests which we have termed the High Drain Continuous Test (HDCT) and the Low Drain Continuous Test (LDCT). The High Drain Continuous Test is intended to simulate abuse conditions, such as might be found in leaving a flashlight in the "on" condition over a period of time, even after the battery had, to the user, gone "flat". The Low Drain Continuous Test simulates the conditions experienced by a battery in, for example, a clock. HDCT results are measured in terms of the amount of leakage, whilst LDCT results are measured in terms of failure of the battery due to perforation or splitting of the can. Again, these tests are novel, and produce highly informative results in considerably less time than would otherwise be experienced in the conditions being simulated. Results are generally available in around 4 and 10 weeks respectively, although it will be appreciated that the amount of time required will depend on such factors as the cell which is to be tested and the extent to which it is desired to test the cell, for example.

These new tests (details of which are provided below) have enabled us to quickly and easily assay the effects of various constituents used in cell construction.

The Low Drain Continuous Text for an electrochemical Cell is characterised in that the can is sealed but left uncovered, a high resistance is secured between the poles of the cell so as to complete a circuit, and the cell is monitored as to its condition.

It will be understood that, in this test, monitoring the cell is intended to ascertain whether the call fails during testing. The typical lifetime of a D-size zinc carbon cell is up to about 10 weeks when the resistance is about 300Ω. Other resistances may be used as appropriate, although 300Ω provides useful results. An appropriate resistance for a C-size cell is about 500Ω while, for an AA-size cell it is about 810Ω. The omission of the bottom cover and the over tube is to expose the can to a surrounding atmosphere, thereby enhancing any failure that might occur, which is one reason why this test can be performed in 10 weeks, when it might take 2 years in a clock, for example.

The High Drain Continuous Test for an electrochemical cell involves the cell being preferably fitted with a bottom cover, a low resistance being secured between the top cover and a point on the can wall proximal to the top cover and, thereafter, sliding an overtube onto the can so as to cover substantially as much of the can as possible without dislodging the resistance, weighing the resulting assembly, storing the cell at ambient temperature, preferably 20° C., weighing the cell at intervals during storage if desired, and determining the amount of electrolyte lost during storage by weighing to establish leakage. This last weighing may be effected by removing and weighing the over tube after storage or weighing the cell without the over tube but with the resistance, or both. Addition of the bottom cover during this test is particularly advantageous in preventing corrosion at the bottom of the can during the test.

A suitable resistance for this test for a D-size cell is 3.9Ω and about 5Ω for an AA-size cell, and the test is typically carried out for 4 weeks, testing at weekly intervals. The normal discharge life for a D cell is about 6 hours in this test until the cell becomes useless. Testing for 4 weeks, for example, establishes how the cell stands up to abuse conditions.

The present invention will now be illustrated with respect to the accompanying Examples wherein percentages are by weight, unless otherwise specified. The Test Examples are followed by certain Test Protocols appropriate to the Test Examples or which are not known in the art. Unless otherwise stated, the zinc cans used in the present examples typically comprise 0.4% lead and 0.03% manganese and have a wall thickness of 0.46±0.03 mm. The mix for the cathode typically comprises 52% manganese dioxide, 0.4% zinc oxide, 6% acetylene black and 41.6% zinc chloride solution (26.5% zinc chloride w/v). Otherwise, cells are generally manufactured in accordance with EP-A-303737.

EXAMPLE 1

Performance Retention Testing

The performance retention (PR) test was carried out using various additives, and the results are as follows.

| ADDITIVE | PR (%) |
| --- | --- |
| None | 82% |
| Cetrimide | 75% |
| Sodium p-toluenesulphonate | 75% |
| Forafac 1110D | 75% |
| Crodamet C20 | 85% |
| Triton X45 | 82% |

Thus, it can be seen that the compounds of the present invention actually improve the performance retention of the cells in which they are used.

EXAMPLE 2

Ability of Additives to Prevent Corrosion, Leakage and Perforation

Additives are screened by coating the additive on the can. This is accomplished by making a 1–10% aqueous solution of the additive. The solution is then poured in to an empty zinc can and the excess poured away. Some is left adhered to the inside of the can. The cans are stored to allow the water to evaporate, leaving a layer of additive on the inside of the can. These cans, having a residue of additive, are then manufactured into cells for testing, such as the HDCT/LDCT test. The separator used is an additive-free separator comprising highly cross-linked starch+gelling agent (starch : gel ratio of 10.5:1, Vulca 90+Tylose MH200K).

The results are shown in Table 1 below. 100% represents total failure of the cell. A "*" indicates a compound of the invention.

TABLE 1

| Class of Compound | Trade Name | CI | 4 w HDCT | 5 w LDCT |
| --- | --- | --- | --- | --- |
| Fluoroalkyl Polyoxyethylene Ether | Forafac 1110D | 20 | 2.7 g | 100% |
| NONE | NONE | 12 | 2.7 g | 60% |
| Alkyl Polyoxyethylene Ether | Tergitol TMN6 | 12 | 2.1 g | 10% |

TABLE 1-continued

| Class of Compound | Trade Name | CI | 4 w HDCT | 5 w LDCT |
| --- | --- | --- | --- | --- |
| Arylalkyl Polyoxyethylene Ether | Synperionic OP11 | 12 | 2.7 g | 17% |
| Arylalkyl Polyoxyethylene Ether | Triton X45 | 16 | 2.0 g | 0% |
| Alkyl Phosphate Ester | Triton QS44 | 10 | 2.8 g | 71% |
| Imidazolium | Crodazoline O | 6 | 5.0 g | 100% |
| Alkyl Polyoxyethylene Ether | Makon NF12 | 6 | 2.0 g | 80% |
| Amphoteric (Ammonium + Sulphur) | Manro NAB | 10 | 1.5 g | 14% |
| *Alkyl Polyoxyethylene Amide | Crillion LDE | 6 | 1.6 g | 30% |
| Benzyl Trialkyl Ammonium | Dodigen 226X | 8 | 1.8 g | 66% |
| *Alkyl Polyoxyethylene Ammonium | Quadrilan MY211 | 8 | 1.7 g | 40% |
| *Tallow-Polyoxyethylene Monoamine x + y = < 6 | Ethylan TT05 | 6 | 1.9 g | 60% |
| *Tallow-Polyoxyethylene Monoamine x + y = < 6 | Ethylan TT203 | 8 | 2.0 g | 40% |
| *Tallow-Polyoxyethylene Diamine x + n = 6 – 30 | Ethylan TD10 | 8 | 1.9 g | 14% |
| *Tallow-Polyoxyethylene Monoamine x + y = > 30 | Ethylan TT40 | 8 | 1.7 g | 30% |
| *Tallow-Polyoxyethylene Monoamine x + y = 6 – 30 | Crodamet T15 | 10 | 0.7 g | 25% |
| *Tallow-Polyoxyethylene Monoamine x + y = 6 – 30 | Ethylan TF15 | 8 | 1.0 g | 65% |
| Sodium Toluenesulphonate | | 10 | 1.9 g | 5% |
| *Coconut-Polyoxyethylene Monoamine x + y = < 6 | Crodamet C5 | 8 | 1.6 g | 0% |
| Trimethyl Alkyl Ammonium | Cetrimide | 10 | 1.2 g | 0% |
| *Coconut-Polyoxyethylene Monoamine x + y = 6 – 30 | Ethylan TLM | 8 | 1.3 g | 0% |
| *Coconut-Polyoxyethylene Monoamine x + y = 6 – 30 | Crodamet C20 | 8 | 1.2 g | 0% |

From the above, it can be seen that the compounds of the invention are as good as, or better than, known compounds of the art in the HDCT and LDCT tests.

EXAMPLE 3

Known Additives, alone or in Combination, Do Not Reduce Gassing to the Extent Shown by Compounds of the Invention Following the method of the previous Example, known surfactants, both alone and in combination, were tested for their advantageous properties. The results are shown in Table 2 (only the last row is a compound of the present invention).

TABLE 2

| | Organic Surfactant Type | Trade Name | CI | 4w HDCT | 7w LDCT | Gassing rel. to F(EtO) = 100% |
|---|---|---|---|---|---|---|
| F(EtO) | Fluoro Polyoxyethylene Ether | Forafac 1110D | | | | 100% |
| N | Trimethyl Alkyl Ammonium | Cetrimide | 8 | 1.4 g | 14% | 140% |
| EtO | Arylalkyl Polyoxyethylene Ether | Triton X45 | 13 | 2.0 g | 0% | 85% |
| N + EtO | Trimethyl Alkyl Ammonium + Arylalkyl Polyoxyethylene Ether | Cetrimide + Triton X45 | — | 2.0 g | 0% | 85% |
| N(EtO) | Coconut Polyoxyethylene Amine | Crodamet C20 | 8 | 1.2 g | 0% | 50% |

The desirable properties for HDCT, LDCT & Gassing cannot all be achieved by a simple admixture of polyoxyethylene ether and trimethyl alkyl ammonium.

EXAMPLE 4

Comparison of Different Separators

Separators were made as described, and the results of various tests are shown below in Table 3. The separators (designated as Sep. 1–5) were made from:

| Sep. 1. | Stable Class 1 Highly cross-linked corn starch | Vulca 90 |
| | Unstable Class 2 corn starch | Cleargel |
| | Unstable Class 3 soluble starch | Instant Pureflo |
| | Arylsulphonate | Na Toluenesulphonate |
| Sep. 2. | Stable Class 1 Highly cross-linked potato starch | Vector R120 |
| | Stable Class 3 Methyl Cellulose Ether gellant Tylose | MH200K |
| | Fluoropolyoxyethylene Ether | Forafac 1110D |
| Sep. 3. | Stable Class 1 Highly cross-linked corn starch | Celex |
| | Unstable Class 2 corn starch | Rongum CE3 |
| | Unstable Class 3 gum gellant | Kiprogum |
| | Additive free | |
| Sep. 4. | Stable Class 1 Highly cross-linked corn starch | Vulca 90 |
| | Stable Class 3 Methyl Cellulose Ether gellant Tylose | MH200K |
| | Trimethyl Alkyl Ammonium | Cetrimide |
| Sep. 5. | Stable Class 1 Highly cross-linked corn starch | Vulca 90 |
| | Stable Class 3 Methyl Cellulose Ether gellant Tylose | MH200K |
| | Coconut Polyoxyethylene Amine | Crodamet C20 |

TABLE 3

| | HDCT | LDCT | Gassing | Fresh Perf. | Fresh SCA | Performance after 13w/45° C./50% r.h. |
|---|---|---|---|---|---|---|
| Sep. 1 | 1.9 g | 60% | 231% | 100% | 6.2A | 100% |
| Sep. 2 | 2.6 g | 78% | 100% | 103% | 6.6A | 99% |
| Sep. 3 | 4.2 g | 100% | 217% | 99% | 7.0A | 106% |
| Sep. 4 | 1.4 g | 30% | 140% | 99% | 5.7A | 93% |
| Sep. 5 | 1.2 g | 10% | 50% | 102% | 6.3A | 105% |

In the above Table, Separator 2 was taken as the standard (100%) in the gassing test, and Separator I was taken as the standard (100%) in the performance tests.

Sep. 1
  Advantages
  Moderate HDCT; Fresh performance & SCA
  Disadvantages
  Poor Gassing Sep. 2
  Advantages
  Lowest gassing of existing separators, good fresh performance & SCA
  Disadvantages
  Poor HDCT & LDCT Sep. 3
  Advantages
  Good storage performance & SCA
  Disadvantages
  Poor HDCT & LDCT Sep. 4
  Advantages
  Good HDCT & LDCT, Moderate gassing
  Disadvantages
  Poor Fresh Performance & SCA. Very poor 13w/45° C./50% r.h. Performance Sep. 5
  Advantages
  Good HDCT & LDCT, Lowest gassing of any separator. Moderate SCA & good performance
  Disadvantages NONE It will be appreciated that only Sep. 5 (the only separator of the present invention) achieves all of the desired requirements of a separator.

EXAMPLE 5

Comparison Testing of Combinations of Additives and Coating Compositions

Various additives were tested in combination with various separators coated with various starches and gellants in both the LDCT and the HDCT tests. The results are shown in Table 4.

It can clearly be seen from the results that highly cross-linked starches and methylcellulose ether are preferable as coatings in these tests, while the polyoxyethylene amines of the invention are preferable to the compounds of the art. The tallow compounds of the invention preferably have polyoxyethylene side chains which are at least 10 units long, and preferably at least 40 units long, on average.

TABLE 4

| | | Stable Class 1 Highly Cross Linked Corn Starch | Vulca 90 | | Vulca 90 | | | |
| --- | --- | --- | --- | --- | --- | --- | --- | --- |
| | | Stable Class 3 Methyl Cellulose Ether | Tylose MH200K | | | | Tylose MH200K | |
| | | Stable Class 1 Highly Cross Linked Potato Starch | | | | | Vector R120 | |
| | | Unstable Class 3 Moderate Cross Linked Corn Starch | | | Cleargel | | | |
| | | Unstable Class 3 Soluble Starch | | | Instant Pureflo | | | |

Additive Coated on Can
3w & 5w LDCT

| | | 3W | 5W | 3w | 5w | 3w | 5w |
| --- | --- | --- | --- | --- | --- | --- | --- |
| Fluoroalkyl Polyoxyethylene Ether | Forafac 1110D | 10% | 40% | 58% | 100% | 92% | 100% |
| NONE | NONE | 10% | 50% | 60% | 100% | | |
| Trimethyl Alkyl Ammonium | Cetrimide | 0% | 7% | 30% | 70% | 0% | 30% |
| Aryl Sulphur | Na Toluenesulphate | 0% | 47% | 60% | 70% | 100% | 100% |
| Tallow-polyoxyethylene mono-amine x + y = 5 | Ethylan TT05 | 10% | 40% | 90% | 100% | | |
| Tallow-polyoxyethyene mono-amine x + y = 40 | Ethylan TT40 | 0% | 10% | 80% | 100% | | |
| Coconut-polyoxyethylene mono-amine x + y = 5 | Crodamet C5 | 0% | 10% | 10% | 60% | | |
| Coconut-polyoxyethylene mono-amine x + y = 20 | Crodamet C20 | 0% | 0% | 0% | 20% | 0% | 20% |
| | AVERAGE | 4% | 25% | 49% | 78% | 48% | 63% |

Additive Coated on Can
4w HDCT

| | | 4w | 4w | 4w |
| --- | --- | --- | --- | --- |
| Fluoroalkyl Polyoxyethylene Ether | Forafac 1110D | 2.4 | 2.4 | 2.6 |
| NONE | NONE | 2.4 | 2.2 | |
| Trimethyl Alkyl Ammonium | Cetrimide | 1.8 | 2.3 | 1.8 |
| Aryl Sulphur | Na Toluenesulphate | 2.0 | 1.8 | 2.4 |
| Tallow-polyoxyethylene mono-amine x + y = 5 | Ethylan TT05 | 2.0 | 2.2 | |
| Tallow-polyoxyethylene mono-amine x + y = 40 | Ethylan TT40 | 1.8 | 1.9 | |
| Coconut-polyoxyethylene mono-amine x + y = 5 | Crodamet C5 | 1.6 | 1.8 | |
| Coconut-polyoxyethylene mono-amine x + y = 20 | Crodamet C20 | 1.5 | 1.8 | 1.7 |
| | AVERAGE | 1.9 | 2.1 | 2.1 |

| | | | | | | |
| --- | --- | --- | --- | --- | --- | --- |
| | Stable Class 1 Highly Cross Linked Corn Starch | | | | | |
| | Stable Class 3 Methyl Cellulose Ether | | | Tylose MH200K | | |
| | Stable Class 1 Highly Cross Linked Potato Starch | Vector R120 | | | | |
| | Unstable Class 3 Moderate Cross Linked Corn Starch | Cleargel | | Rongum CE3 | | |
| | Unstable Class 3 Soluble Starch | Instant Pureflo | | | | |

Additive Coated on Can
3w & 5w LDCT — AVERAGE

| | | 3w | 5w | 3w | 5w | 3w | 5w |
| --- | --- | --- | --- | --- | --- | --- | --- |
| Fluoroalkyl Polyoxyethylene Ether | Forafac 1110D | 100% | 100% | 100% | 100% | 67% | 85% |
| NONE | NONE | 100% | 100% | 100% | 100% | 68% | 88% |
| Trimethyl Alkyl Ammonium | Cetrimide | 80% | 100% | 100% | 100% | 53% | 69% |
| Aryl Sulphur | Na Toluenesulphate | 90% | 100% | 100% | 100% | 63% | 79% |
| Tallow-polyoxyethylene mono-amine x + y = 5 | Ethylan TT05 | 100% | 100% | 100% | 100% | 75% | 85% |
| Tallow-polyoxyethyene mono-amine x + y = 40 | Ethylan TT40 | 100% | 100% | 100% | 100% | 70% | 78% |
| Coconut-polyoxyethylene mono-amine x + y = 5 | Crodamet C5 | 80% | 100% | 90% | 100% | 45% | 68% |
| Coconut-polyoxyethylene mono-amine x + y = 20 | Crodamet C20 | 70% | 100% | 42% | 80% | 28% | 50% |
| | AVERAGE | 90% | 100% | 91% | 98% | | |

Additive Coated on Can
4w HDCT — AVERAGE

| | | 4w | 4w | 4w |
| --- | --- | --- | --- | --- |
| Fluoroalkyl Polyoxyethylene Ether | Forafac 1110D | 2.4 | 2.8 | 2.5 |
| NONE | NONE | 2.3 | 2.7 | 2.4 |
| Trimethyl Alkyl Ammonium | Cetrimide | 1.8 | 3.1 | 2.2 |
| Aryl Sulphur | Na Toluenesulphate | 2.0 | 2.2 | 2.1 |
| Tallow-polyoxyethylene mono-amine x + y = 5 | Ethylan TT05 | 2.0 | 3.1 | 2.1 |
| Tallow-polyoxyethylene mono-amine x + y = 40 | Ethylan TT40 | 2.1 | 2.3 | 2.0 |
| Coconut-polyoxyethylene mono-amine x + y = 5 | Crodamet C5 | 1.9 | 2.4 | 1.9 |
| Coconut-polyoxyethylene mono-amine x + y = 20 | Crodamet C20 | 1.6 | 2.2 | 1.8 |
| | AVERAGE | 2.0 | 2.6 | |

Test Protocols

Preparation of Separators

The first step in the preparation of a separator is to prepare the paste to be used for the coating of the paper. The formulations used in the present Examples were as follows:

| | | |
| --- | --- | --- |
| Water | | 64.3% |
| Organic Additive | (e.g. Crodamet C20) | 0.5% |
| Gellant | (e.g. Tylose MH200K) | 3.1% |
| Starch | (e.g. Vulca 90) | 32.1% |

Three methods were commonly employed for making up the paste. These were as follows:

Paste Method 1 (Used for the Separators of the Examples)

1. Add the organic additive and gellant to water and mix, using a high shear mixer, such as a Silversen type mixer (Silversen Machine Mixer Emulsifier Model L2R, UK).
2. Place the resulting mixture in a paddle mixer, such as a Hobart mixer, add the starch, and mix until a smooth paste is obtained.

Paste Method 2
1. Add the gellant to the water and mix in a paddle mixer, such as a VMI mixer (Rayneri Model R6001, France).
2. Add the starch and continue mixing.
3. Add the organic additive and continue mixing until a smooth paste is obtained.

Paste Method 3
1. Mix the powders together.
2. Add the mixed, dry powders to the water and stir in a paddle mixer.
3. Add organic additive and continue mixing until a smooth paste is formed.

The end products of these methods are virtually identical, and any method is suitable.

The separator paste is then coated onto the paper. The technique used in the above Examples is to run the coated paper between two rollers set apart by a predetermined distance in order to provide the desired coating weight when dry. The rollers are suitably set so that they run in opposite directions, with the forward roller running fastest. A suitable coating machine is made by Dixons (Dixons Pilot Coating Machine Model 160, UK).

The dry coating weight is measured in $gm^{-2}$ (gsm). Suitable gsm are 40 (for D cells), 30 (for C cells) and 20 (for AA cells).

The coated paper in the above Examples is then dried either by oven-drying at 100–140° C. and/or by steam drum-drying at 100–150° C.:

HDCT (High Drain Continuous Test)
1. cell is manufactured as above. The bottom cover is added but no overtube.
2. 3.9Ω resistors are soldered between the cover and the top of the can adjacent the cover. Cells are weighed ($w_1$) 3. Overtubes are weighed ($w_2$)
4. The overtube is pushed on cell but NOT spurs in. The cell is weighed ($w_3$).
5. The HDCT cells are stored at 20° C. for 4w. The normal discharge life for D on a 3.9Ω test is ~6 h. 4w represents an abuse test to simulate a consumer leaving equipment switched on.
6. At weekly intervals (1w, 2w, 3w & 4w) ¼ of the original cells are removed and measurements are taken. The complete discharged cell is weighed ($w_4$).
7. The overtube is removed and weighed ($w_5$).
8. The resulting cell with soldered resistor still intact is weighed ($w_6$).
9. The HDCT leakage is $w_6-w_1$.

LDCT (Low Drain Continuous Test)
1. Cell is manufactured as above. For LDCT NO bottom cover is added and NO overtube.
2. 300Ω resistors are soldered between the cover and the top of the can adjacent the cover.
3. Cells are monitored at weekly intervals up to 10w. This would be the normal lifetime for a D cell on a 300Ω test. This test is a simulation of a cell being used on a long duration test such as a clock.
4. A failure is when perforation or splitting of the can is observed. This would allow $O_2$ into the cell causing premature failure when on a long duration test.

SCA Test
The cell is shorted and the current passed is measured on zero (very low) impedance meter. The resulting measurement is the SCA (Short Circuit Current) of the cell.

IEC Discharge Performance Tests
These are Industrial Standard tests which are measured on Fresh cells (1–2 weeks at 20° C.) and Aged cells (13 weeks @ 45° C. and 50% r.h.).

Gassing Test
Cells are not fitted with a sealant or closure, allowing gas generated in the cell to escape. Cells are sealed in a glass container fitted with a stopper and a glass tube. The containers are immersed in a water bath at the required temperature. The open end of the glass tube is placed in a water bath and a water-filled graduated gas tube is positioned to collect any gas from the tube. The volume of gas generated is measured over 30 days.

Corrosion Test
A container is filled with 25% zinc chloride solution containing 0.01% of a potential inhibitor. Strips of battery zinc alloy are immersed in the solution and the container closed to exclude air. The test specimen is stored at 45° C.

Visual examination of the strip is made at 3-weekly intervals and strips are assessed by 4 criteria:
1. General attack;
2. Small pits (<0.1 mm);
3. Large pits (>0.1 mm);
4. Uniformity of corrosion.

Each criterion is measured on a scale of 1 (low) to 5 (high). The scores are totalled, and the overall score is the corrosion index (CI). Controls are performed using no potential inhibitors.

What is claimed is:
1. An electrochemical cell comprising:
   a zinc anode, a cathode, an acidic electrolyte, a separator between the zinc anode and the cathode, and a polyoxyalkylene nitrogen-containing compound, wherein the polyoxyalkylene portion of the polyoxyalkylene nitrogen-containing compound has a chain length of from 3 to 15 on average.
2. The electrochemical cell of claim 1, wherein the polyoxyalkylene nitrogen-containing compound is an amine.
3. The electrochemical cell of claim 1, wherein the polyoxyalkylene nitrogen-containing compound is an ammonium compound.
4. The electrochemical cell of claim 1, wherein the alkylene portions of the polyoxyalkylene nitrogen-containing compound are the same.
5. The electrochemical cell of claim 1, wherein the alkylene portions of the polyoxyalkylene nitrogen-containing compound are selected from ethylene and propylene groups.
6. The electrochemical cell of claim 1, wherein the alkylene portions of the polyoxyalkylene nitrogen-containing compound are ethylene groups.
7. The electrochemical cell of claim 1, wherein the nitrogen of the polyoxyalkylene nitrogen-containing compound is substituted by at least one polyoxyalkylene group, and at least one optionally substituted alkyl group.
8. The electrochemical cell of claim 7, wherein the alkyl group is substituted by one or more hydroxy groups and/or halogen atoms.
9. The electrochemical cell of claim 7, wherein the alkyl group is unsubstituted.
10. The electrochemical cell of claim 7, wherein the alkyl group is a straight chain alkyl group.

11. The electrochemical cell of claim 7, wherein the alkyl group contains from 1 to 30 carbon atoms.

12. The electrochemical cell of claim 1, wherein the polyoxyalkylene nitrogen-containing compound contains a plurality of amine groups.

13. The electrochemical cell of claim 12, wherein the amine groups are linked to each other by alkylene groups.

14. The electrochemical cell of claim 13, wherein the alkylene groups are short chain alkylene groups.

15. The electrochemical cell of claim 14, wherein the alkylene groups are trimethylene groups.

16. The electrochemical cell of claim 1, wherein the polyoxyalkylene nitrogen-containing compound includes two amine groups, the amine groups being linked by one alkylene group.

17. The electrochemical cell of claim 1, wherein the polyoxyalkylene nitrogen-containing compound contains two amine groups, the amine groups being linked by one alkylene group, and wherein a first of the amine groups has one polyoxyalkylene substituent and one straight chain alkyl substituent having from 1 to 30 carbon atoms, and a second of the amine groups has two polyoxyalkylene substituents.

18. The electrochemical cell of claim 1, wherein the polyoxyalkylene portion of the polyoxyalkylene nitrogen-containing compound has a chain length of 10, on average.

19. The electrochemical cell of claim 1, wherein the polyoxyalkylene nitrogen-containing compound is derived from coconut amines.

20. An electrochemical cell comprising a zinc anode, a cathode, an acidic electrolyte, a separator between the zinc anode and the cathode, and a polyoxyalkylene nitrogen-containing compound having one of the two following general formulae:

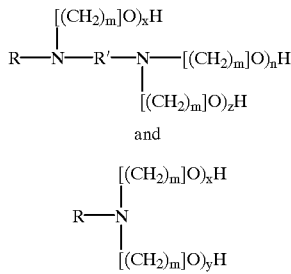

and

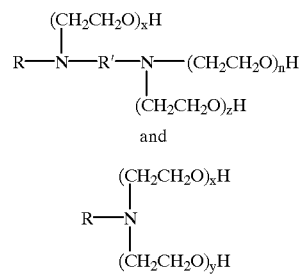

wherein R represent an optionally substituted alkyl group having from 1 to 30 carbon atoms, R' represents an alkyl group having a from 2 to 10 carbon atoms, each m is the same or different and represents an integer from 1 to 4 inclusive, and n, x, y, and z are the same or different, and each represents an integer from 1 to 30.

21. The electrochemical cell of claim 20, wherein R has an average of about 10 carbon atoms.

22. The electrochemical cell of claim 20, wherein R' has 3 or 4 carbon atoms.

23. The electrochemical cell of claim 20, wherein each m is 2.

24. The electrochemical cell of claim 20, wherein n, x, y and z each averages about 10.

25. The electrochemical cell of claim 20, wherein R is unsubstituted.

26. An electrochemical cell comprising a zinc anode, a cathode, an acidic electrolyte, a separator between the zinc anode and the cathode, and a polyoxyalkylene nitrogen-containing compound having one of the two following general formulae:

$$R-\underset{(CH_2CH_2O)_zH}{\underset{|}{N}}-R'-\underset{(CH_2CH_2O)_nH}{\underset{|}{N}}-(CH_2CH_2O)_nH \quad \text{where top sub is } (CH_2CH_2O)_xH$$

and $$R-\underset{(CH_2CH_2O)_yH}{\underset{|}{\overset{(CH_2CH_2O)_xH}{\overset{|}{N}}}}$$

wherein R represents an optionally substituted alkyl group having from 1 to 30 carbon atoms, R' represents an alkyl group having from 2 to 10 carbon atoms and n, x, y and z are the same or different, and each represents an integer from 1 to 30.

27. The electrochemical cell of claim 26, wherein R has an average of about 10 carbon atoms.

28. The electrochemical cell of 26, wherein R' has 3 or 4 carbon atoms.

29. The electrochemical cell of claim 26, wherein n, x, y and z each averages about 10.

30. The electrochemical cell of claim 26, wherein R is unsubstituted.

31. The electrochemical cell of claim 26, having no added mercury.

\* \* \* \* \*